Nov. 3, 1942.   C. BARNHART   2,300,765
ASPIRATOR
Filed Oct. 26, 1938
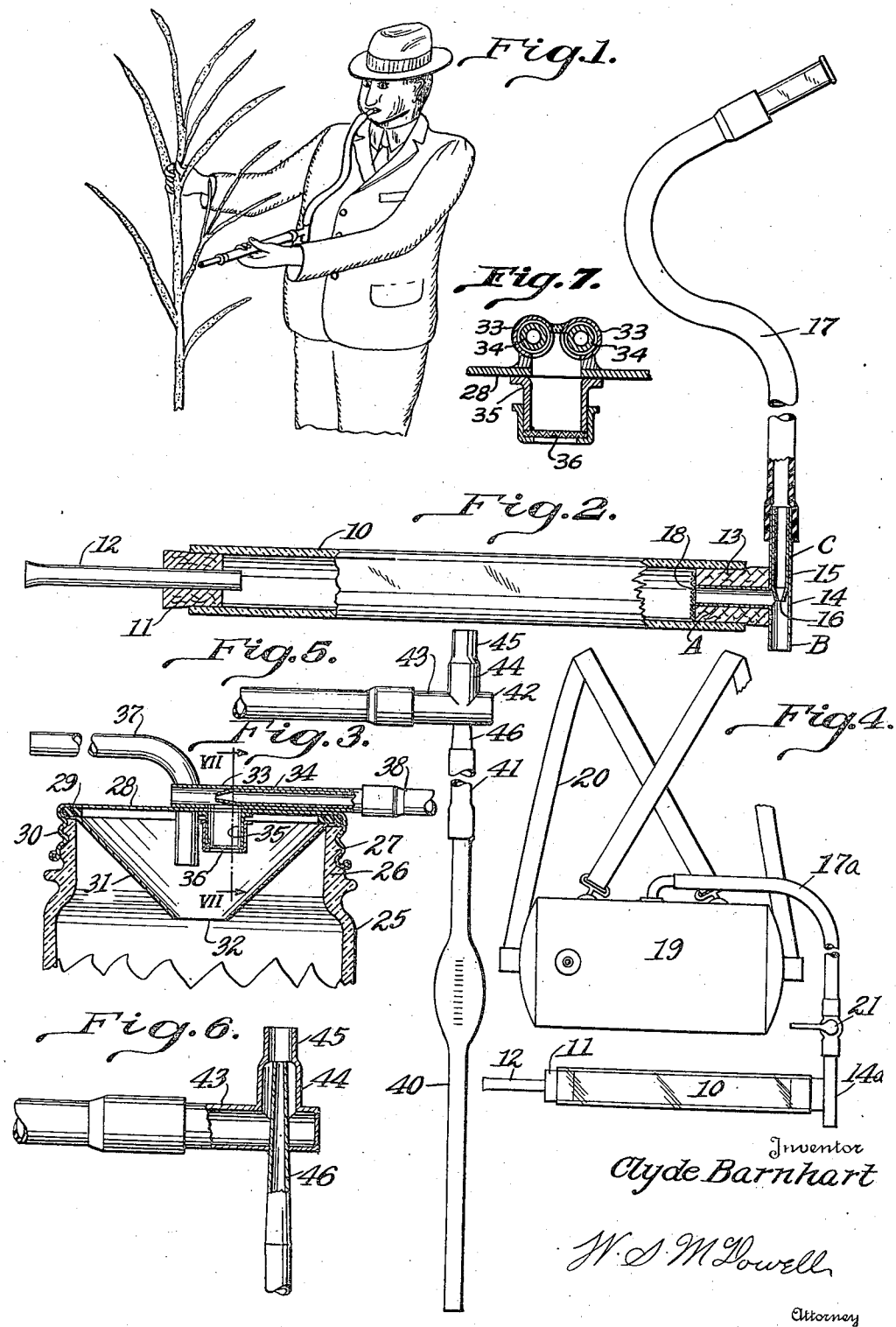
Inventor
Clyde Barnhart
W. S. McDowell
Attorney

Patented Nov. 3, 1942

2,300,765

UNITED STATES PATENT OFFICE 2,300,765

ASPIRATOR

Clyde Barnhart, Columbus, Ohio

Application October 26, 1938, Serial No. 237,110

2 Claims. (Cl. 43—139)

This invention, relating to aspirators, has particular reference to aspirators adapted upon actuation to produce suction forces of sufficient magnitude in an associated receptacle or chamber to draw objects or bodies into the receptacle or chamber.

While the aspirator of the present invention is adapted for many uses, it finds a field of special application in the construction of insect collectors of the portable manually operated type used by entomologists and others in the capture of insects.

In collecting insect specimens, a device quite commonly used consists of a receptacle having an inlet open to the atmosphere at one end and at the other a flexible tube leading to the mouth of the operator. This device is operated by the inhaled breath of the user drawn through the tube connected with the receptacle, such inhalation producing suction creating forces within the receptacle to cause the forced entry of insects or other relatively small bodies into the receptacle. Such devices are rather difficult to operate. Under certain circumstances, the objects or bodies drawn into the receptacle often pass through the inhalation tube and into the mouth of the operator.

Accordingly, it is a primary object of the present invention to provide an improvement in insect collectors of this type wherein the receptacle is provided with an improved aspirator structure so mounted in connection with the receptacle that suction creating forces are produced by the exhaled or outwardly blown breath of the user, which forces are of such nature as to cause the entry of the insects or other relatively small bodies into the collecting chamber of the receptacle. The principal advantage of the construction resides in the fact that the operation of the device is effected by the expelled breath of the user, providing a more convenient, sanitary and facile operation than is accomplished by the use of prior devices of this type.

In another form of my invention, there is utilized a small tank containing air under pressure, the tank being strapped or otherwise secured on the body of the user, and a control valve being provided for governing the flow of air through the aspirator. In this form of the invention, the air to operate the aspirator is supplied from the tank, rather than relying upon the exhaled breath of the operator.

Another object of the invention is to provide a detachable aspirator for use in connection with laboratory apparatus such as pipettes or the like, wherein the rise of liquids in such apparatus is effected by the exhaled breath of the operator, rather than relying on the inwardly drawn breath, as heretofore.

For a further understanding of the invention, reference is to be had to the following description and the accompanying drawing, wherein:

Fig. 1 is a perspective view disclosing my improved insect collector when in operation;

Fig. 2 is a vertical longitudinal sectional view thereof;

Fig. 3 is a vertical sectional view through a modified form of the invention;

Fig. 4 is a view in elevation of the device when used with an air supplying tank;

Fig. 5 is a view in elevation disclosing the aspirator when used in connection with a pipette.

Fig. 6 is a vertical longitudinal sectional view of an aspirator designed especially for use in connection with a pipette employed in obtaining samples of liquids.

Fig. 7 is a detail vertical sectional view taken on the plane indicated by the line VII—VII of Fig. 3.

In the form of the invention disclosed in Figs. 1 and 2, the insect collector comprises a hollow glass cylinder 10. One end of the cylinder is closed by means of a stopper 11, in which is positioned an air inlet tube 12. The opposite end of the cylinder, which forms the trapping receptacle, is provided with a stopper 13 in which is arranged the branch A of a T-shaped fitting 14, the branch B of the fitting 14 leads to the atmosphere, while the vertically aligned branch C thereof is formed internally with a nozzle 15 having an attenuated tip 16, said tip being arranged adjacent the branch A. A flexible tube 17, which is adapted to lead to the mouth of the operator, is connected with the outer end of the branch C of said fitting. The stopper 13 is provided with a screen 18 to retain insects or bodies within the confines of the cylinder 10 when the aspirator is in use.

In the operation of the device, the cylinder 10 is supported in the hands of the user. The outer end of the inlet tube 12 is placed in juxtaposition to the insects or other atmospheric bodies to be trapped. The breath of the user is then blown through the tube 17 and issues at high velocity from the tip end of the nozzle 15.

The aspirator effect thus established sets up an induced flow of air through the inlet tube 12, the flow being of such magnitude as to carry in entrainment therewith lightweight bodies or insects drawn from the atmosphere from the immediate environs of the outer end of said tube.

The device is simple, convenient and sanitary to operate and effectively serves its intended purposes. It may be modified, however, as shown in Fig. 4 by the employment of a tank 19. This tank may be secured by means of straps 20 to the body of the operator. Preferably, the tank is adapted to be filled with compressed air, obtained from any convenient source. A flexible tube 17a leads from the tank 19 to a control valve 21, joined with the aspirator fitting 14a, the latter being mounted, as previously described, in connection with one end of the cylinder 10. In this form of my invention, the air to operate the device is supplied from the tank 19, rather than by using the exhaled breath of the operator.

In the form of my invention disclosed in Fig. 3, the receiving receptacle comprises a glass bottle or jar 25, the latter being of standard form having the neck portion 26 thereof formed with external screw threads 27. Adapted to close the open end of the bottle 25 is a metallic screw cap 28. Within this cap or closure, there is positioned a gasket 29 of a flexible material. This gasket is mounted so as to seat upon the annular flange 30 of a frusto-conical deflector element 31, the flange 30 of said element being positioned on the rim of the neck 26 and securely held in such position when the cap 28 is tightened on the threads 27 of the bottle neck. The body of the deflector is placed within the neck of the bottle and terminates at its lower end in a restricted opening 32, permitting the ready passage of insects or other relatively light-weight bodies into the interior of the receptacle, and confining them against escape, particularly when the screw cap is removed.

Formed with the cap or closure 28 and arranged on the top thereof is one or more horizontally disposed tubes 33. In this tube, there is positioned a nozzle 34, having the tip end thereof terminated over an air-expelling tubular extension 35, depending from the bottom of the cap 28. The bottom of this extension is equipped with a screen 36. A laterally directed air inlet tube 37 is also carried by the cap 28. The outer end of the nozzle 34 is connected with a flexible tube 38, which leads either to the mouth of the operator, or to a source of air supply, such as the tank 19.

In the operation of the device disclosed in Fig. 3, a gaseous fluid is discharged from the tip end of the nozzle 34 in the form of a high velocity stream. This sets up an induced flow of air from the interior of the receptacle through the extension 35. The displaced air produces a suction effect within the receptacle, causing the forced flow of air from the atmosphere into the receptacle through the inlet tube 37.

For instance, as disclosed in Fig. 5, the aspirator head is adapted for use in association with a laboratory pipette, the latter being indicated at 40. Ordinarily, in the use of a pipette, the lips of the user are placed to the upper end thereof, so that by breath inhalation, liquid may be drawn upwardly into the pipette for examination, transference or other purposes. It often happens, however, that, unless the user is very careful, a portion of the liquid may be drawn into the mouth. This condition is obviated by the use of the aspirator head comprising the present invention since the latter operates, as previously stated, by the expelled breath of the user. As shown in Fig. 5, the upper end of the pipette is equipped with a short section of flexible tubing 41. The other end of this tubing is connected with a special T fitting 42 designed for use with a pipette.

As disclosed in Fig. 6, the actuating fluid is introduced under pressure to the fitting 42 through the branch 43 which connects at its outer end with a vertical branch 44. The latter branch terminates at its upper end in a reduced extension 45. A nozzle 46 enters one side of the branch 43 and projects into the branch 44 terminating in a reduced outlet at its upper end. The outlet of the nozzle is disposed at the point where the branch 44 is reduced so that as the fluid flows outward from the branch 44 to the extension 45, it will move on a path tangent to the nozzle 46 and a vacuum will be produced therein. This negative pressure will be transmitted to the pipette by the tubing 41.

By this construction, a marked suction effect is produced within the pipette, so that sufficient air is displaced from the upper portion thereof to admit of the rise of a liquid column therein. When the desired elevation of the column has been effected, it may be held in the pipette by compressing the tubing 41 tightly with the fingers, so that the fluid will not run out of the lower end.

Having thus described the invention, what I claim as new is:

1. A device for capturing inserts and light-weight bodies from the atmosphere comprising: a receptacle, a removable closure arranged at one end of said receptacle, a pair of horizontally arranged tubes joined with and extending across the outer side of said closure, said tubes being apertured intermediately of their length with the apertures thereof registering with a corresponding aperture formed in said closure, nozzles positioned in said tubes, said nozzles having restricted tips arranged in registration with said apertures, a flexible conduit connected with said tubes through which breath exhaled from the mouth of the user of the device is advanced in a confined flow stream for discharge at high velocity from the restricted tip ends of said nozzles, and an inlet tube carried in connection with said closure and establishing communication between the interior of said receptacle and the atmosphere.

2. A structure as specified in claim 1, in combination with a frusto-conical deflector detachably clamped between said closure and one end of said receptacle.

CLYDE BARNHART.